Oct. 29, 1963   A. B. WINTER   3,109,101
PHOTOELECTRIC COMMUTATOR WITH ROTATABLY MOUNTED PLATE
Filed Dec. 10, 1958   4 Sheets-Sheet 1
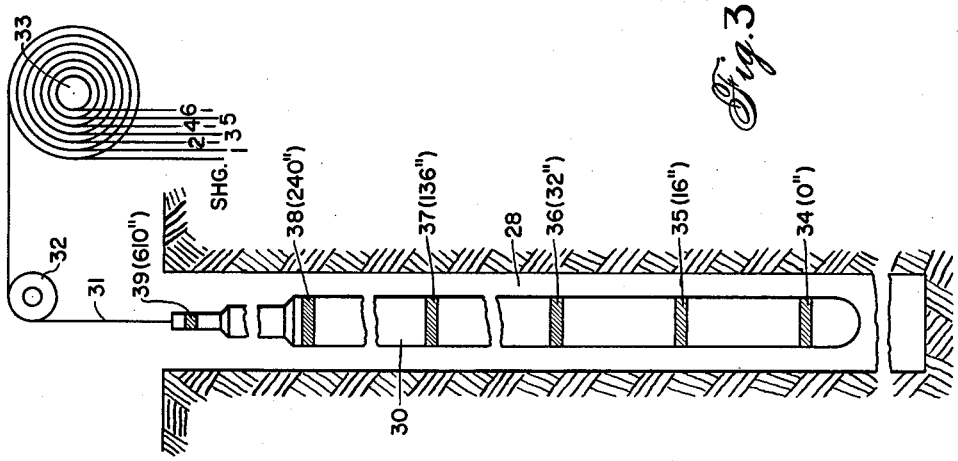
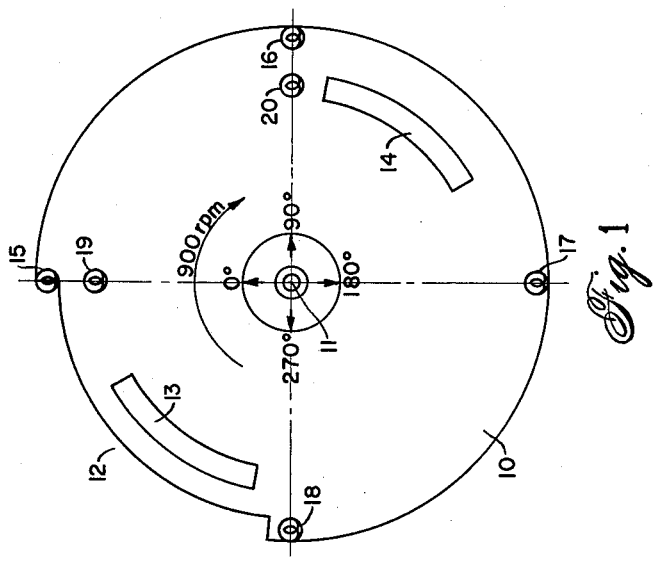
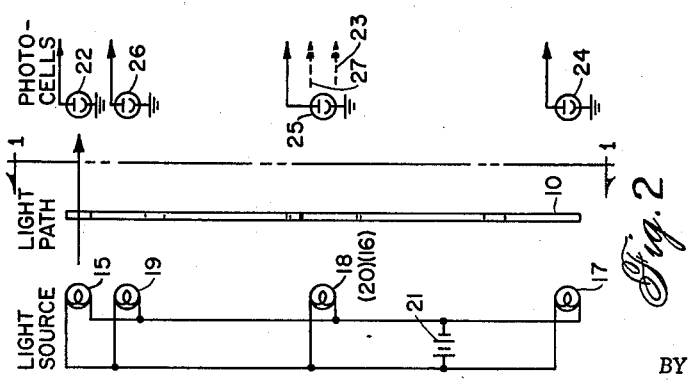
INVENTOR.
ARTHUR B. WINTER
BY James B. Gambrell
ATTORNEY

INVENTOR.
ARTHUR B. WINTER

INVENTOR.
ARTHUR B. WINTER
BY James B. Gambrell
ATTORNEY

United States Patent Office 3,109,101
Patented Oct. 29, 1963

3,109,101
PHOTOELECTRIC COMMUTATOR WITH
ROTATABLY MOUNTED PLATE
Arthur Burman Winter, Houston, Tex., assignor to
Dresser Industries, Inc., Dallas, Tex., a corporation of
Delaware
Filed Dec. 10, 1958, Ser. No. 779,382
4 Claims. (Cl. 250—233)

This invention broadly relates to electrical logging systems for investigating the subsurface lithology by obtaining measurements of resistivity and natural potentials. More particularly, it relates to electrical logging systems which employ photoelectric means to commutate currents and control potentials.

The measurement of the resistivity of subsurface formations has long been one of the most effective ways to obtain information on the types of strata through which a borehole has been drilled. Though there have been differences of opinion, it is generally conceded that a plurality of resistivity measurements, including the so-called "normal" and "lateral" curves are desirable. As is well known in the prior art, the normal curves are designed to provide information on the subsurface strata immediately adjacent the borehole, whereas the lateral curves provide information on the strata laterally more remote from the borehole.

The most common electrical logging systems employ a surface commutator, generally an electro-mechanical one, which cooperates with a source of power to generate a square wave current. The output is supplied in turn to appropriate conductors for transmission to electrodes mounted on the subsurface tool whereby one or more electric fields are established in the earth formations surrounding the borehole. Once a current field is established, one or more sets of pickup electrodes are employed to sample the current after it flows through the subsurface strata. The information obtained is transmitted to the surface where it is employed to provide pertinent information on the subsurface formations through which the borehole is drilled.

Mechanical square wave systems have always faced major maintenance problems. Heavy contact erosion not to mention excessive brush wear are the principal objections. The latter particularly makes it difficult to maintain the close timing necessary for current generation. A lesser problem is that of suppressing current spikes to prevent interconductor reaction. Mose mechanical commutators in use employ a plurality of commutator segments, slip rings, and brushes to phase the current and to sample it after it is influenced by the surrounding formations and current is not being switched. Brush wear, which causes the phasing to shift, is thus a real maintenance complaint.

The present invention overcomes many of the defects in previous systems by employing photoelectric means cooperating with a rotating disc for performing the commutating and current switch blanking functions. The disc permits a light path to be interrupted rather than an electrical current path. As a result, no particular wear problems exist; that is, no problems similar to the ones generally associated with mechanical commutator types of square wave generators.

Thus, one of the principal objects of the present invention is to provide an electric logging system which is simple, economical and less subject to the deleterious effects of current commutation. The present system does not employ complicated electronic components, but utilizes conventional surface components to give service-free operation.

The present electric logging system is designed to obtain, substantially simultaneously, two normal resistivity curves, two lateral resistivity curves, and a natural potential (SP) curve. The exemplary embodiment of the present system is arranged to obtain a 16" short normal (SN), 32" long normal (LN), 10' short lateral (SL), and 18'8" long lateral (LL), and a spontaneous potential (SP). This is one common combination of curves presently obtainable in the logging industry. Of course, other combinations are possible if different electrode spacings and conductor combinations are employed.

The photoelectric commutating means of the present electrical logging system includes an apertured flat disc, a plurality of light sources and photoelectric cells. As the disc rotates, the light source (s) contacts certain ones of the photoelectric cells, each of which is associated with one or more current switching relays. Some of the relays in operating permit the establishment of normal and lateral logging currents as well as blank current spikes which occur as the polarity of the square wave currents are reversed, while other relays act to synchronously rectify detected signals.

The blanking circuit associated with each logging current is operated at a point in rotation subsequent to the completion of the logging current path of interest. The operation of the blanking circuit closes a path between appropriate pickup electrodes and their cooperating surface receiving equipment. Shortly before the logging current circuit is disconnected, the blanking circuit is de-energized and the pickup circuit to the recording galvanometers is opened again. Thus, during the period of time in which a logging current is being switched there is no electrical path established between any pickup electrodes and their surface recording equipment. This prevents transitory spikes generated when current is switched from reaching any of the receiving channels. The commutator disc in the preferred embodiment in rotating alternately establishes a half-cycle of the logging current for a normal curve and a half-cycle for a lateral curve, and blanks the appropriate receiving channel during the time the currents are switched. This alternate generation is employed to simplify the pulse stretching means associated with the recording galvanometers.

The use of this photoelectric type of commutation provides a simple and efficient means for overcoming one of the principal defects in conventional systems. This feature of the present invention particularly distinguishes it from prior electrical logging systems and commends its general acceptance.

These and other objects and features may be more fully understood when the following detailed description is read with reference to the drawings in which:

FIGURE 1 is a schematic representation of the photoelectric commutator disc taken along line 1—1 of FIGURE 2;

FIGURE 2 is a side view of the photoelectric commutator disc of FIGURE 1 including the source (s) of light and photoelectric cells;

FIGURE 3 is a schematic representation of an exemplary logging tool which may be used with the present system;

Figure 4:
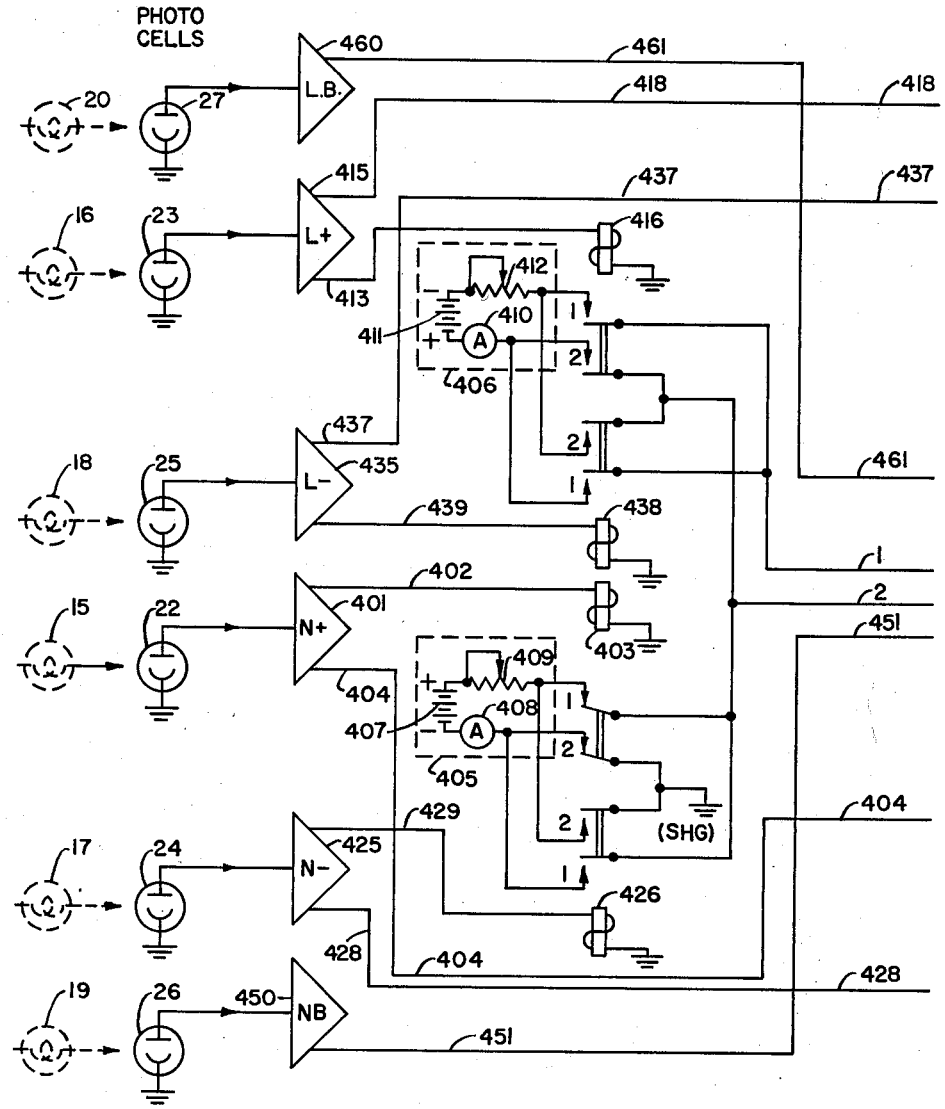
Figure 5:
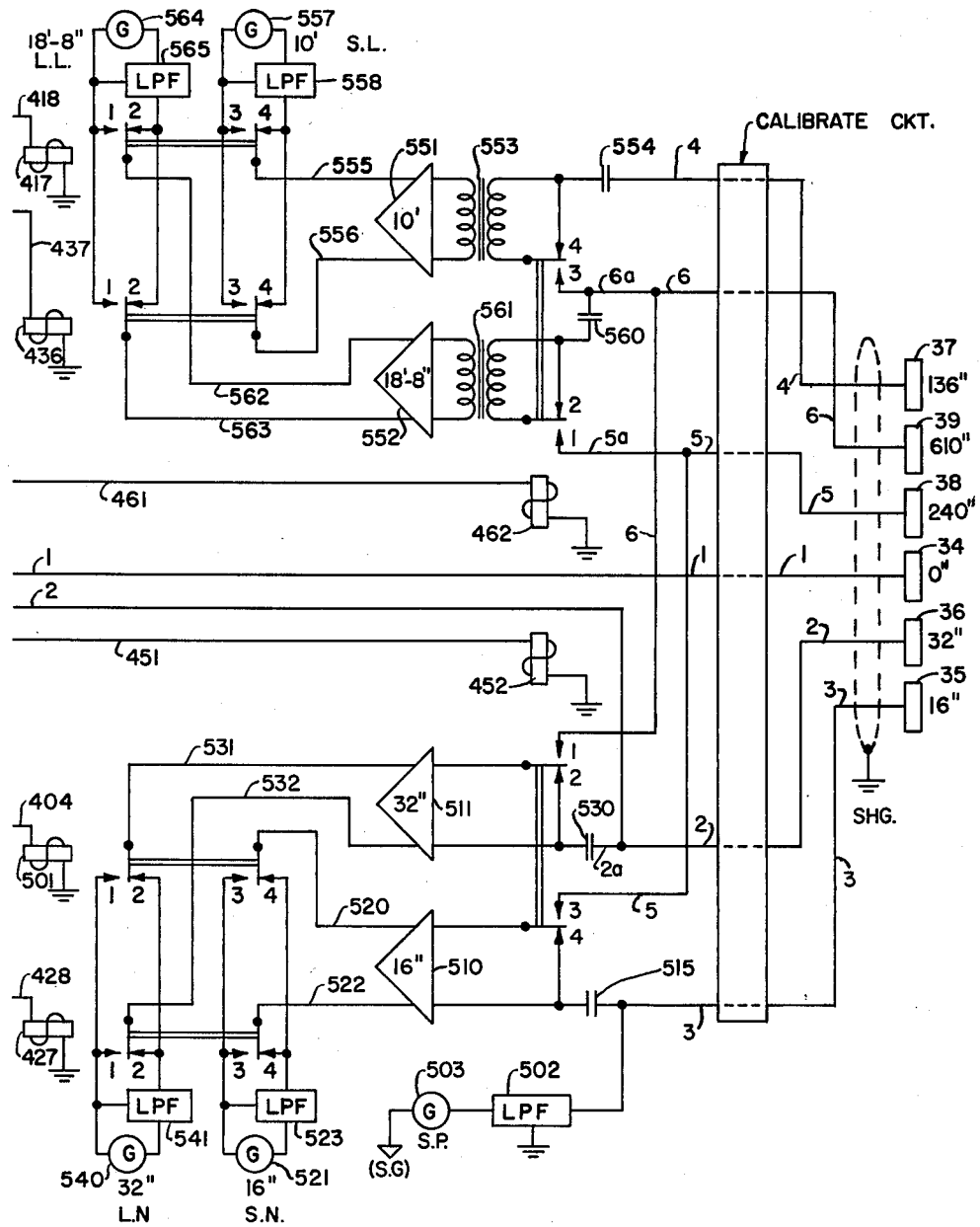
Figure 6:
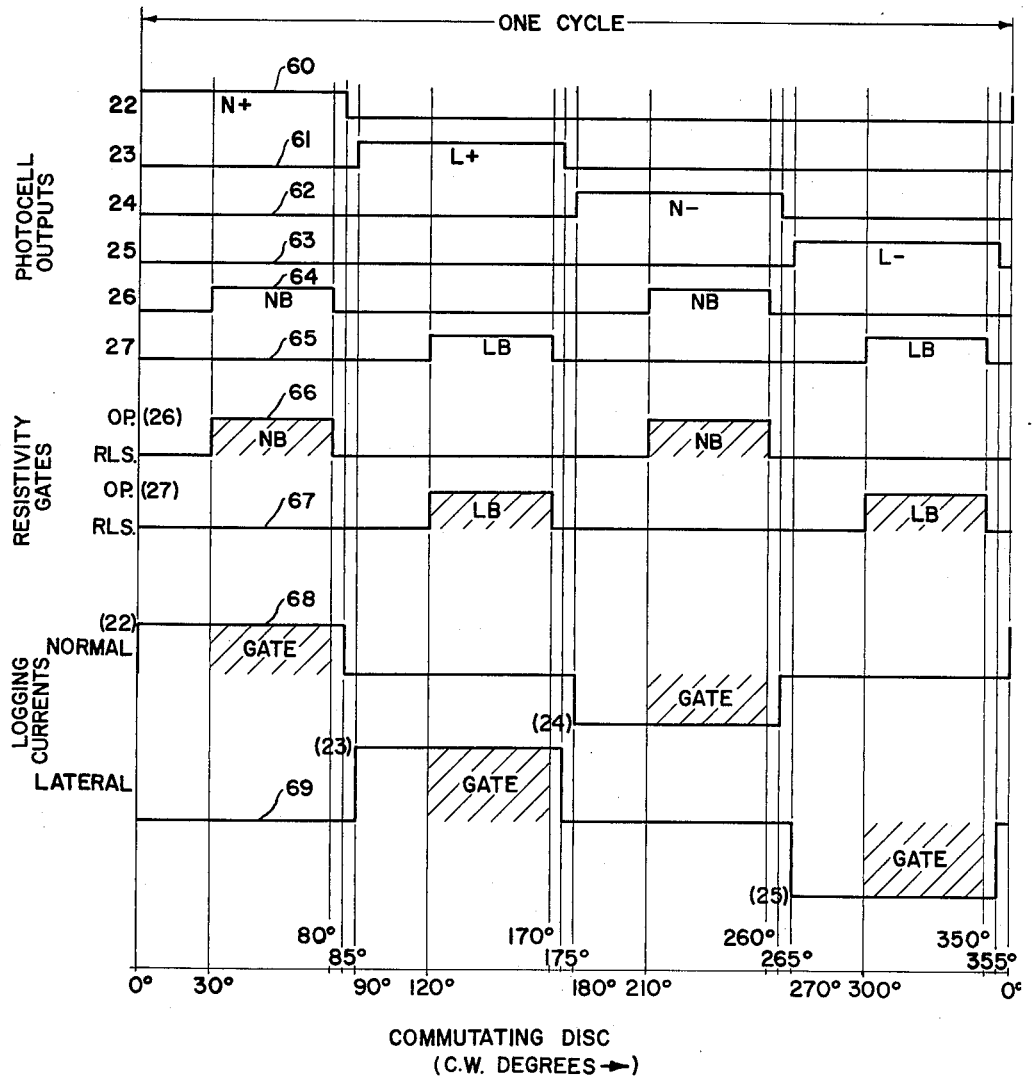

FIGURES 4 and 5 schematically represent an electric logging system in accordance with the present invention; and FIGURE 6 graphically depicts the output of the photoelectric cells, the logging currents and the operations of the resistivity gates.

Looking in detail at FIGURES 1 and 2, the photoelectric commutator may be seen to comprise a flat circular disc 10 with which a plurality of light sources 15—20 (connected to battery 21) and photoelectric cells 22—27 cooperate. The disc 10 is supported for rotation by a shaft 11 of a synchronous motor (not shown).

In the exemplary embodiment, the disc 10 rotates in a clockwise direction at a speed of 900 revolutions per minute to generate a 15 c.p.s. alternating square wave current as will be more fully explained hereinafter.

The disc 10 has a cutout 12 defined by its outer surface which arcuately extends 85 degrees. This psuedo-aperture or cutout 12 cooperates with light source-photoelectric cell combinations fixedly mounted on opposite sides of the commutating disc 10 and at 90 degree intervals. The disc 10 shields a light from contacting its photoelectric cell until the cutout 12 is rotated to a position between them.

As may be noted, particularly by referring to FIGURE 2, the photoelectric cells 22—25 and their respective cooperating light sources 15—18 are fixedly supported on proper sides of disc 10 at a radius equal to the distance to the midpoint of slot 12. Further than this, the light source 15 and its cooperating photoelectric cell 22 are fixedly supported along a vertical axis (with respect to the orientation of FIG. 1) which is designated 0°. Light source 16 and its cooperating cell 23 are displaced 90° therefrom in a clockwise direction; that is, light source 16 and photoelectric cell 23 lie along the axis designated 90° on FIG. 1. Similarly, light source 17 and its photoelectric cell 24 lie along the 180° axis, and light source 18 and its cooperating cell 25 lie along the 270° axis. The choosing of these axes is purely arbitrary except that they are picked in this manner in order to lay out the circumference of disc 10 in FIGURE 6 to show the relative timing of photoelectric potential generation, establishment of logging current and the functioning of the resistivity or spike eliminating gates. FIGURE 6 will be explained below. It is assumed for the purposes of the subsequent explanation of the system and its operation that the disc 10 is oriented with respect to the light source 15—20 and photoelectric cells 22—27 such that the slot or cutout 12 is just beginning to uncover light sources 15 and 19 so that they impinge on their respective photoelectric cells 22 and 26.

As will be apparent from the foregoing, as the disc 10 rotates the cutout 12 sequentially uncovers photoelectric cells 22—25 and permits their respective light sources 15—18, which are mounted in the same relative positions but on opposite side of the disc 10, to contact them. As the slot 12 moves past photoelectric cell 22, for example, the light source 15 associated therewith contacts the cell 22 to generate a small potential. As disc 10 continues to rotate, photoelectric cells 23, 24, and 25 generate small potentials under the influence of their respective light sources 16—18. These potentials are employed to drive relays which in turn switch direct current sources to provide the square wave logging current desired.

A pair of oppositely disposed slots or apertures 13 and 14 are provided at smaller radii than that of cutout 12 to control the resistivity gates or blanking means for preventing current spikes from being impressed on the receiver channels. To do this, photoelectric cells 26 and 27 are positioned behind the disc 10 on the 0° and 90° axes and at the radius of the midpoint of apertures 13 and 14. Cooperating light sources 19 and 20 lie on the same axes but in front of the disc 10. Apertures 13 and 14 are 50° in arcuate length, and aperture 13 is constructed to lag the slot 12 by 30° at its leading edge and to lead it by 5° at its trailing edge (assuming the clockwise rotation). Thus, as disc 10 rotates clockwise, the slot 12 uncovers a given light source-photocell combination which acts to switch current some 30° before the slot 13 or 14 permits light source 19 or 20 to impinge upon its cooperating cell 26 or 27 thereby to control a resistivity gate. Thereafter, 5° before slot 12 passes beyond an instant light source-photocell combination, the slot 13 or 14 passes beyond its cooperating combination. This interrupts the light path to cell 26 or 27, as the case may be. The blanking potentials generated also ulti-mately driven relays (blanking relays 452 or 462) which in turn connect the receiving channel or disconnect it to avoid the transfer current spikes.

The arrangement and disposition of the cooperating light sources and photoelectric cells permit the establishment of a sequential series of control voltages which are applied actually to photocell amplifiers 401, 415, 425 or 435. These in turn are connected in the circuit so that a square positive pulse of normal current is generated, a square positive pulse of lateral current, a square negative pulse of normal current and, finally, a square negative pulse of lateral current, in that order. Each time the disc 10 rotates one complete revolution, these four logging currents are supplied to appropriate current electrodes as will be developed hereinafter.

This sequence of operations may be more fully understood with reference to FIGURE 6 wherein a complete cycle of the photocell potentials, logging currents, and resistivity gating sequences are illustrated. These curves are correlated along the abscissa with respect to the degrees of rotation of disc 10 from the arbitrary 0° position in a clockwise direction. The upper six curves illustrate the sequential outputs of the photoelectric cells 22 through 27, generated as a result of their light source being uncovered by the rotation of disc 10. For example, curve 60 indicates that photoelectric cell 22 generates an output potential for the first 85° of rotation of the disc 10; curve 61 indicates that photoelectric cell 23 generates a potential beginning after 90° of rotation and ending 85° later at 175°; curve 62 indicates that photoelectric cell 24 generates a potential beginning after 180° and ending at 265°; and curve 63 indicates that photoelectric cell 25 generates an output potential beginning after 270° and ending at 355°. The potential output of photoelectric cells 22 and 24 act to operate Normal polarity reversing relays 403 and 426 which in turn apply power source 405 (FIGURE 4) between conductor 2 and sheath ground and reverse the polarity on alternate applications. The actual Normal logging current is exemplified by curve 68 (FIGURE 6). In a similar manner the output of photoelectric cells 23 and 25 act to operate Lateral polarity reversing relays 416 and 438 which in turn apply power source 406 to conductors 1 and 2 and reverse the polarity on alternate applications. The Lateral logging current is exemplified by curve 69 (FIGURE 6).

Turning to the blanking function or blanking means, curves 64 and 65 exemplify the results of the interaction of light sources 19 and 20 and their cooperating photoelectric cells 26 and 27. After the disc 10 has rotated 30° from its starting position (as shown on FIGURE 1), the slot 13 permits light source 19 to impinge upon photoelectric cell 26 thereby to generate a potential which persists for 50° of rotation of disc 10. After the disc 10 has rotated another 130°–210° total, the slot 14 uncovers light source 19 and another potential is generated for the succeeding 50° of rotation. This is depicted on curve 64. Curve 65 shows a similar cooperation between apertures 13 and 14, light source 20, and its cooperating photoelectric cell 27. Hence, 30° after the slot 12 uncovers the light source 16, the slot 13 permits light source 20 to impinge upon its photoelectric cell 27 generating a photocell output for the succeeding 50°. Another 120° finds slot 14 uncovering the light source 20 and its co-operating cell 27 to again permit a photoelectric cell potential to be generated for 50° arcuate length.

The photoelectric cell output of cell 26, as exemplified in curve 64, is used to drive directly a resistivity gate relay 452 (FIGURE 5) which connects the appropriate pickup electrodes to the two normal receiving channels. The photoelectric potential generated by cell 27 (curve 65) in a similar manner energizes the resistivity gate relay 462 which connects appropriate pickup electrodes to the two lateral receiving channels. The operated (OP) and released (RLS) state of gating or blanking relays 452 and 462 are illustrated by curves 66 and 67 (FIGURE 6). This same information is shown by cross-hatch on the normal and lateral logging current curves 68 and 69.

Now that the inter-relationship between the disc 10 and the apertures thereon and the cooperating light sources and photoelectric cells has been explained in some detail, it next remains to explain in detail how the voltages generated in the photoelectric cells are employed to permit the over-all electrical logging system to function as a system. But first, FIGURE 3 schematically represents the exemplary logging tool with the electrodes properly oriented one to another. The logging tool 30 is caused to traverse the borehole 28 by means of cable 31. Cable 31 traverses pulley 32 and is vertically moved by rotation of drum 33 (by means not shown). Slip rings associated with drum 33 (not shown) transfer the conductors 1 to 6 and sheath to the surface equipment. The electrodes 34—39 are referenced to electrode 34 as the 0" band.

There are two sources of constant current 405 and 406 provided for the over-all logging system (FIGURE 4). Source 405 provides normal logging current and source 406 provides lateral logging current. An exemplary source 405 might include a battery 407, an ammeter 408 and a variable resistor 409 connected in series. The variable resistor 409 is adjustable to provide a preselected amplitude of normal current as registered on the ammeter 408. In a similar manner, source 406 may include a serially connected ammeter 410, battery 411 and variable resistor 412. As above, the current for the lateral curves is adjusted by the variable resistor 412. It might be noted parenthetically that the lateral current usually has a greater amplitude than the normal current in order to compensate for the greater current to pickup electrodes separation.

Looking more particularly to FIGURES 4 and 5, the system may be explained. As the disc 10 begins to rotate from its illustrated position (FIGURE 1), the light source 15 contacts its photoelectric cell 22 thereby generating a photoelectric potential. This potential is applied to the input of a relay amplifier 401 which amplifies the signal. The amplified output is applied over lead 402 to one side of a normal polarity switching relay 403 and to a normal polarity gating relay 501.

Upon application of said amplifier output, relay 403 operates since the other side of the winding is connected to ground. The operation of relay 403 connects the positive side of source 405 over front contact 1 of relay 403 to conductor 2 and grounds the negative terminal of source 405 over front contact 2 of relay 403 (positive half-cycle of curve 68— FIGURE 6). Since conductor 2 is connected directly to electrode 36 (32" electrode), the normal current from source 405 is applied between electrode 36 and sheath ground (SHG). The application of this positive normal current component is continued during 85° of rotation of disc 10, as previously explained, at which time the light source is interrupted. Relay 403 releases which disconnects source 405 from conductor 2 and sheath ground. Normal polarity gating relay 501 operates when the output of amplifier 401 is applied to one side of its winding since the other terminal is connected to ground. Relay 501 in operating acts to maintain the polarity of the received signals applied to the SN and LN receiving channels constant, irrespective of whether the positive or negative half-cycle of the normal current is sampled.

As the disc 10 continues to rotate, the cutout 12 uncovers light source 16 from its associated photoelectric cell 23 thereby generating a photoelectric potential which is applied the input of relay amplifier 415. The amplified output is applied over lead 413 to one side of polarity switching relay 416 to complete a circuit therefor and over lead 418 to lateral selector channel relay 417 to complete a circuit for its winding.

Relay 416 in operating connects the positive terminal of source 406 over a front contact 1 of relay 416 to conductor 1 which is directly connected to 0" electrode 34, and the negative terminal over front contact 2 of relay 416 to conductor 2. The operation of polarity switching relay 416 therefore completes a current path in the formation between the 32" electrode 36 and the 0" electrode 34. This circuit is maintained for 85° of rotation of disc 10 at which time light source 16 is interrupted and relays 416 and 417 release. The operation of lateral polarity gating relay 417 acts to maintain the polarity of the signals applied to the SL and LL receiver channels constant.

As the disc 10 continues its rotation and cutout 12 passes the 180° axis, photoelectric cell 24 generates a potential due to light source 17. The potential is fed to a relay amplifier 425 and the output of the amplifier completes an operating path over lead 429 for normal polarity switching relay 426 and over lead 428 for polarity gating relay 427. The operation of polarity switching relay 426 reverses the terminal connections at source 405 so that conductor 2 is negative with respect to ground. Conductor 2 is connected to the negative terminal of source 405 over front contact 1 of relay 426 while the positive side of the circuit is grounded over front contact 2 of relay 426. This forms the negative half-cycle of the normal logging current (curve 68, FIGURE 6). As a result of the polarity switching of normal current source 405, the normal 15 c.p.s. square wave is generated. The negative portion of the normal current continues for the 85° length of the slot or cutout 12 (until the 265° mark is passed). Normal polarity gating relay 427 in operating acts to maintain the polarity of the received normal signals constant as they are applied to the galvanometers.

As the disc 10 completes three-quarters of one revolution, the light source 18 strikes its photoelectric cell 25 thereby generating a potential which is applied to relay amplifier 435. The output from amplifier 435 energizes the winding of a second lateral polarity gating relay 436 over conductor 437 and a polarity switching relay 438 (over lead 439). Relay 438 in operating switches the polarity of lateral current source 406 so that the positive terminal thereof is connected to conductor 2 over a front contact 2 of relay 438 and the negative terminal is connected to conductor 1 over front contact 1 of relay 438. This negative lateral current flows through the formation for 85° at which time the light source-photoelectric cell path is interrupted. Five degrees later a new revolution of disc 10 starts. As in the case of polarity gating relay 427, relay 436 operated maintains the received signals of the SL and LL channels constant.

A résumé of the generation of the logging currents shows that the positive and negative half-cycles of the normal and lateral currents are alternately generated and take the form depicted by curves 68 and 69 on FIGURE 6. By generating the positive and negative components of a particular current alternately with the other permits sampling once every half-cycle rather than twice in two quarter cycles followed by two quarter cycle interruptions before the current is sampled again. Experience has shown that this method is superior to other sequences. It also permits smaller shifts in the response characteristics of the formation bounded by the borehole to be detected. This technique also simplifies the pulse stretching networks which cooperate with the respective recording galvanometers. Since a constant or D.C. signal forms the input to the recording galvanometers, the stretching network required to extend any particular signal until the next signal is received may be simpler if the signals are sampled on a shorter time interval.

The 16" and 32" normal resistivity values are sampled over separate pairs of conductors twice during each revolution of the disc 10, i.e., during the positive and negative half-cycles. Similarly, the 10' and 18'8" lateral resistivities are sampled over separate pairs of conductors twice during the positive and negative half-cycles of the lateral current. As explained supra, the sampling occurs during an intermediate part of the time during which the appropriate current is flowing in the formation.

The following table résumés the particular conductors and electrodes employed to obtain the normal, lateral and S.P. curves.

| Curve | Current | | Pickup | |
|---|---|---|---|---|
| | Conductors | Electrodes | Conductors | Electrodes |
| SN | 1<br>SHG | $C_1=0''$<br>$C_2=SHG$ | 3<br>5 | $P_1=16''$<br>$P_2=240''$ |
| LN | 1<br>SHG | $C_1=0''$<br>$C_2=SHG$ | 2<br>6 | $P_1=32''$<br>$P_2=610''$ |
| SL | 1<br>2 | $C_1=0''$<br>$C_2=32''$ | 4<br>6 | $P_1=136''$<br>$P_2=610''$ |
| LL | 1<br>2 | $C_1=0''$<br>$C_2=32''$ | 5<br>6 | $P_1=240''$<br>$P_2=610''$ |
| S.P. | | | 3 | $P_1=16''$<br>$P_2=S.G.$ |

Looking first to the 16" and 32" normal resistivities, it can be seen that the signals are directed over appropriate make contacts of normal gating relay 452 to individual voltage amplifiers 510 and 511. The amplified outputs are applied to the swingers on the normal polarity gating relays 427 and 501 which act as synchronous converters since they are driven at the rate of the logging current frequency. Since the conductors 5—3 and 6—2 are not connected to the inputs of amplifiers 510 or 511 except during the period of time in which blanking occurs (gating relay 452 operated) there can be no transfer of current spikes from the conductor 2–SHG circuit over which the logging current is established. Taking the short normal or 16" normal as a first example and referring more particularly to FIGURE 5, it can be seen that the resistivity signal is detected between the 240" electrode 38 (as a remote ground) and the 16" electrode 35. Conductor 3 connects electrode 35 to one input terminal of amplifier 510 through an isolating capacitor 515. Conductor 5 connects electrode 38 through front contact 3 on relay 452 to the other input terminal of amplifier 510. In the normal released condition of relay 452, a back contact 4 on relay 452 which is connected to conductor 3 shorts the input of the amplifier 510. This is done to prevent switching current transients from reaching the galvanometers. During the time the normal current is established in the subsurface formation and during the time resistivity gate 452 is operated the shunt is removed from the amplifier input. Amplifier 510 amplifies the signal and places it over leads 520 and 522 between swingers associated with polarity gating relays 501 and 427, respectively. If the normal current flowing through the formation is the positive part of the normal current, as assumed, relay 501 will be operated as a result of the potential output of photoelectric cell 22. In this case then, the output lead 520 is connected to one side of recording galvanometer 521 over front contact 3 of relay 501 and the output lead 522 over back contact 4 of relay 427 to one side of low pass filter 523 which in turn is connected to the second terminal of galvanometer 521. The low pass T-pad 523 is further connected to the other side of the galvanometer 521 in a conventional manner. With this galvanometer circuit completed the positive normal current displaces the galvanometer needle in a proper direction. The filter network 523 is so designed to stretch the received signal to subsist until a new sample is obtained.

When the negative normal current flows the normal gate 452 again operates to apply the detected sample at the input terminals to amplifier 510. From there it is again placed on the respective swingers of relay 501 and 427. However, since relay 501 is now released and relay 427 operated instead, the polarity of the sample is reversed as it is applied to the two terminals of galvanometer 521. Thus, one side of the galvanometer is connected over front contact 3 of relay 427 to lead 522 while the LPF filter 523 side of the galvanometer 521 is connected to lead 520 over back contact 4 of relay 501. As a result of this synchronous conversion by relays 427 and 501, the signal applied to the recording galvanometer circuit is always of the same polarity and, hence, does not cause the galvanometer to make any false excursions.

In a similar manner, the positive normal current is sampled between the 610" electrode 39 (as a remote ground) and 32" electrode 36 and transmitted over conductors 6 and 2 and operating contacts of relay 452 to the input terminals of amplifier 511 to provide a 32" normal resistivity measurement. Conductor 2 is connected through isolating capacitor 530 to an input terminal of amplifier 511 while conductor 6 is connected over front contact 1 of relay 452 to the other input terminal. A connection between conductor 2 and the back contact 2 of relay 452 provides means for shorting the input of amplifier 511 during the time a blanking potential is not being generated by the commutator. Again, it is for the purpose of blocking current transients from the resistivity amplifiers and recording galvanometers.

The output of the 32" normal amplifier 511 is connected over leads 531 and 532 to swingers on polarity gating relays 501 and 427, respectively—as was the case with the output of the 16" normal amplifier. The galvanometer circuit for the 32" normal signal is functionally the same as the 16" normal channel. Thus, with the positive half-cycle of current flowing through the formation, lead 531 is connected to one side of galvanometer 540 over front contact 1 of relay 501 and lead 532 to one side of an LP filter 541 over back contact 2 of relay 427. Filter 541 is connected at its other two terminals to the opposite sides of galvanometer 540. With this positive signal poled properly for galvanometer 540, when the negative half-cycle occurs the leads 531 and 532 are reversed, i.e., lead 531 is connected to the LP filter 541 over back contact 2 of selector channel relay 501 and lead 532 to one side of galvanometer 540 over front contact 1 of relay 427. In this manner the polarity of the signals applied to the galvanometer 540 is maintained constant. 10' and 18'8" lateral resistivities are sampled during each positive and negative part of the lateral current cycle. The conductor-electrode table set forth earlier shows that each lateral resistivity sample is detected and transmitted to the surface equipment over separate electrode-conductor pairs. The signals are directed over appropriate make contacts of lateral gating relay 462 to individual voltage amplifiers 551 and 552. The amplified outputs are applied to swingers on the lateral polarity gating relays 417 and 436 which act as synchronous converters since they are driven at the rate of the logging current frequency. Since the conductors 6—4 and 5—6 are not connected to the inputs of amplifiers 551 or 552 except during the period of time in which blanking occurs (gating relay 462 operated) there can be no transfer of current spikes from the current conductors 1 and 2 to the receiving channels.

Taking the short or 10' lateral as a first example and referring more particularly to FIGURE 5, it can be seen that the resistivity signal is detected between the 136" electrode 37 and the 610" electrode 39 as a remote ground. Conductor 4 connects electrode 37 to one input terminal of ground isolating transformer 553 via an isolating capacitor 554, and conductor 6 connects electrode 39 through front contact 3 on relay 462 to the other input terminal of transformer 553. The secondary winding of transformer 553 is connected to the input terminals of amplifier 551. In the normally released condition of relay 462, a back contact 4 of relay 462, which is connected to conductor 4, shorts the input to the transformer 553. During the time the lateral current is established in the subsurface formation and after the resistivity gate 462 is operated the shunt is removed from the input winding of transformer 553. This permits the signal to be placed of the input of amplifier 551. Amplifier 551 amplifies the signal and places it over leads 555 and 556 to swingers associated with lateral polarity gating relays 417 and 436, respectively. If the lateral current flowing through the formation is the positive part of the current, as assumed, relay 417 will be operated as a result of the potential output of photoelectric cell 23. In this case then, the output lead 555 is connected to one side of recording galvanometer 557 over front contact 3 of relay 417 and the output lead 556 over back contact 4 of relay 436 to one side of low pass filter 558 which in turn is connected to the second terminal of galvanometer 557. The low pass T-pad 558 is also connected to the other side of the galvanometer 557 in a conventional manner. With this galvanometer circuit completed the positive lateral current displaces the galvanometer needle in a proper direction. The filter network 558 is so designed to stretch the received signal to subsist until a new sample is detected.

When the negative lateral current flows the normal gate 462 again operates to apply the detected sample to the input terminals of transformer 553 and then, via the secondary, to the input of amplifier 551. From there it is placed on respective swingers of relay 417 and 436. However, since relay 417 is released now and relay 436 operated instead, the polarity of the sample is reversed as it is applied to the two terminals of galvanometer 557. Thus, one side of the galvanometer is connected over front contact 3 of relay 436 to lead 556 while the LP filter 558 side of the galvanometer 557 is connected to lead 555 over back contact 4 of relay 417. As a result of this synchronous conversion by relays 417 and 436, the signal applied to the recording galvanometer circuit is always of the same polarity and, hence, does not cause the galvanometer to make any false excursions.

In a similar manner, during the presence of the positive lateral current, the current is sampled between the 240" electrode 38 and the 610" electrode 39 (as remote ground). The signal is transmitted over conductors 6 and 5 and operating contacts of relay 462 to the input terminals of amplifier 552 to provide an 18'8" lateral resistivity measurement. Conductor 6 is connected over conductor 6a and through isolating capacitor 530 to one input terminal of transformer 561 while conductor 5 is connected over conductor 5a and front contact 1 of relay 462 to the other input terminal of transformer 561. A connection between conductor 6—6a and the back contact 2 of relay 462 provides means for shorting the input winding of transformer 559 during the time a blanking potential is not being generated by the photoelectric commutator. The secondary winding of transformer 561 is connected to the input of amplifier 552.

The output of the 18'8" lateral amplifier 552 is connected over leads 562 and 563 to swingers on polarity gating relays 417 and 436, respectively, as was the case with the output of the 10' lateral amplifier. The galvanometer circuit for the 18'8" lateral signal is functionally the same as the 10' lateral channel, thus, with the positive half-cycle of current flowing through the formation, lead 562 is connected to one side of galvanometer 564 over front contact 1 of relay 417 and lead 563 to one side of the LP filter 565 over back contact 2 of relay 436. Filter 565 is connected at its other two terminals to the opposite sides of galvanometer 564. With this postive signal poled properly for galvanometer 564, when the negative half-cycle occurs the leads 562 and 563 are reversed, i.e., lead 562 is connected to the LP filter 565 over back contact 2 of selector channel relay 417 and lead 563 to the one side of galvanometer 564 over front contact 1 of relay 436. In this manner the polarity of the signals applied to the galvanometer 564 is maintained constant.

The final characteristic of the subsurface lithology which is obtained during the traverse of the borehole by the exemplary system is the natural potential. The spontaneous potential curve is sampled in the exemplary system between the 16" electrode 35 and surface ground (S.G.).

The slowly varying D.C. signal is transmitted to the surface equipment over conductor 3 along with the 16" normal signal and there separated out by a 0–2 c.p.s. low pass filter 502 and registered on galvanometer 503. Obviously, the S.P. could be sampled by any other one of the conductors or all of them. It is considered better practice though to use the 16" electrode since it is the depth reference for most of the resistivity curves.

The photocell amplifiers 401, 415, 425, 435, 450 and 460 may be conventional power amplifiers since their only function is to amplify the low output from the photoelectric cells so that they are of sufficient magnitude to operate their associated relays. The resistivity amplifiers 510, 511, 551 and 552 are conventional also. One type found satisfactory is a balanced push-pull amplifier having an over-all gain of approximately 75. No specific detailed disclosure of the amplifiers is made since a wide variety of power amplifiers will perform the task required of the amplifiers in the present electrical logging system.

The foregoing describes in detail the operation of an exemplary logging system. However, it should be emphasized that the system is capable of being modified broadly within the spirit and scope of the invention. For example, the box designated calibrating circuit on FIGURE 5 can be inserted in the previously described system to permit dummy loads to be switched across appropriate conductors in order to calibrate the receiver channels. Beyond this, sensitivity potentiometers or discrete sensitivity steps can be incorporated therein. In the working system employed by applicant, ten different sensitivity settings may be made to accommodate the system to different parts of the country. It did not seem necessary to disclose the calibrating and sensitivity adjusting circuits however, since they involve little more than removably inserting a plurality of resistors in series with appropriate cable conductors.

A further modification of the present invention can be suggested. In the exemplary embodiment, each conductor has been associated with a single electrode, but this is not necessary. Downhole synchronous switching between two or more electrodes may be incorporated into the present system without departing from the inventor's intended scope. Such subsurface commutating systems are disclosed and claimed in copending applications of Jefferson P. Lamb, Serial Number 743,380, filed June 20, 1958, and of Robert Lee Alder, Serial Number 710,597, filed January 21, 1958, now U.S. Patent No. 2,986,693, issued May 30, 1961.

While the system has been disclosed in one particular arrangement of electrodes, conductors, and the like, it should be obvious that the invention is not to be so limited. Numerous other arrangements may be envisioned by those skilled in the art without departing from the intended scope of the invention.

I claim:

1. A photoelectric commutator comprising a rotatably mounted plate having at least two cutouts, one of said cutouts arcuately extending beyond both radial sides of the other of said cutouts, a first group of photoelectric cells having at least a pair of cells mounted on one side of said plate adjacent said one cutout, said cells of a pair disposed along radial lines in different quadrants, a second group of photoelectric cells comprising at least one cell mounted adjacent said other cutout on said one side of said plate and supported along one of the radial lines of said pair of cells of said first group, a source of light supported on the opposite sides of said plate adjacent the rotating paths of said cutouts, means to rotate said plate in one direction whereby said cells are sequentially uncovered to permit control potentials to be generated at preselected rates, and means including said one cutout and said first group of cells to establish at least one alternating square wave current field.

2. A photoelectric commutator comprising a rotatably mounted disc having a cutout on its periphery and at least one aperture therein, said cutout arcuately extending beyond both radial sides of said aperture, a first group of photoelectric cells having at least a pair of cells mounted on one side of said disc adjacent said cutout, said cells of a pair oppositely disposed along a separate radial line, a second group of photoelectric cells comprising at least one cell mounted on said one side of said disc and supported along the radial line of said pair of cells of said first group and adjacent said aperture, a source of light supported on the opposite side of said disc adjacent the rotating paths of said cutout and said aperture, means to rotate said disc in one direction whereby said cells are sequentially uncovered to permit control potentials to be generated at preselected rates under the influence of said light source, and means including said cutout and said first group of cells to establish at least one alternating square wave current field.

3. A photoelectric commutator comprising a rotatably mounted disc having a cutout on its periphery and at least one aperture therein, said cutout arcuately extending beyond both radial sides of said aperture, a first group of photoelectric cells having at least a pair of cells mounted on one side of said disc adjacent said cutout, said cells of a pair oppositely disposed along a single radial line, a second group of photoelectric cells comprising at least one cell mounted on said one side of said disc and supported along the radial line of said pair of cells of said first group and adjacent said aperture, a source of light supported on the opposite sides of said disc adjacent the rotating paths of said cutout and said aperture, means to rotate said disc in one direction whereby said cells are sequentially uncovered to permit control potentials to be generated at preselected rates under the influence of said light sources, a variable source of direct current power, means responsive to the output potentials of the cells in a said pair of said first group to connect said source and to reverse the polarity of said source thereby establishing at least one alternating square wave current field, and means including said second group of cells for switching receiving channels employed in measuring passage of current.

4. A photoelectric commutator comprising a rotatably mounted, flat circular disc having a cutout on its periphery and a pair of identical oppositely disposed curvilinear apertures formed at radii less than that of said cutout, said cutout arcuately extending beyond both radial sides of one of said apertures, a first group of photoelectric cells having a plurality of pairs of cells therein mounted on one side of said disc at radial distances extending to the midpoint of said cutout each of said cells spaced along a radius arcuately equidistant from adjacent cells, a second group of photoelectric cells mounted on said one side of said disc and along adjacent ones of said radii at distances extending to the midpoint of said apertures, each one of said cells of said second group associated with a pair of said plurality of cells of said first group which lie along a single radial line, a source of light supported on the opposite side of said disc to cause said cells to generate control potentials whenever said cutout and aperture uncover said cells to permit said source to strike the light-sensitive parts of said cells, means to rotate said disc in one direction whereby said cells are sequentially uncovered to permit said control potentials to be generated at preselected rates, and amplifying means associated with each of said cells to amplify their potential outputs.

References Cited in the file of this patent

UNITED STATES PATENTS

| | | |
|---|---|---|
| 1,987,686 | Kwartin | Jan. 15, 1935 |
| 2,241,371 | Hoxford | May 6, 1941 |
| 2,436,563 | Frosch | Feb. 24, 1948 |
| 2,569,867 | Norelius | Oct. 2, 1951 |
| 2,659,828 | Elliott | Nov. 17, 1953 |
| 2,701,334 | Alder | Feb. 1, 1955 |
| 2,724,183 | Edison | Nov. 22, 1955 |
| 2,779,912 | Waters | Jan. 29, 1957 |
| 2,779,913 | Waters | Jan. 29, 1957 |